US009481222B2

(12) United States Patent
Nakaya

(10) Patent No.: US 9,481,222 B2
(45) Date of Patent: Nov. 1, 2016

(54) VEHICLE AIR-CONDITIONING DEVICE

(71) Applicant: Panasonic Corporation, Osaka (JP)

(72) Inventor: Satoshi Nakaya, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 248 days.

(21) Appl. No.: 14/362,855

(22) PCT Filed: Dec. 4, 2012

(86) PCT No.: PCT/JP2012/007768
§ 371 (c)(1),
(2) Date: Jun. 4, 2014

(87) PCT Pub. No.: WO2013/084476
PCT Pub. Date: Jun. 13, 2013

(65) Prior Publication Data
US 2014/0290299 A1    Oct. 2, 2014

(30) Foreign Application Priority Data

Dec. 5, 2011 (JP) .................. 2011-266205

(51) Int. Cl.
| F25B 13/00 | (2006.01) |
| B60H 1/00 | (2006.01) |
| F25D 21/04 | (2006.01) |
| B60H 1/03 | (2006.01) |

(52) U.S. Cl.
CPC ...... *B60H 1/00021* (2013.01); *B60H 1/00028* (2013.01); *B60H 1/03* (2013.01); *F25D 21/04* (2013.01); *B60H 2001/00164* (2013.01); *B60H 2001/00178* (2013.01)

(58) Field of Classification Search
CPC ... F25B 13/00; F25B 41/046; B60H 1/00371

USPC ............... 62/239, 244, 324.1, 324.6; 165/96
See application file for complete search history.

(56) References Cited

U.S. PATENT DOCUMENTS 4,412,425 A    11/1983    Fukami et al.
5,335,719 A *   8/1994    Khelifa .............. B60H 1/00007
                                                        165/42

(Continued)

FOREIGN PATENT DOCUMENTS

JP    57-099411 A    6/1982
JP    10-016531 A    1/1998

(Continued)

OTHER PUBLICATIONS

International Search Report for Application No. PCT/JP2012/007768 dated Feb. 26, 2013.

(Continued)

*Primary Examiner* — Melvin Jones
(74) *Attorney, Agent, or Firm* — Pearne & Gordon LLP

(57) ABSTRACT

A vehicle air-conditioning device is provided that makes it possible to avoid the occurrence of condensation at a heat exchanger, and to avoid decreases in the heat exchange efficiency of the heat exchanger caused by uneven temperature distribution in the heat exchanger itself. This vehicle air-conditioning device employs a configuration comprising: a heat exchanger that performs heat exchange between air passing through a first flow path and air flowing through a second flow path; and a switching means that alternately switches either the first flow path or the second flow path from a discharge path that discharges the air inside the vehicle toward the outside of the vehicle to an intake path that guides air from outside of the vehicle into the vehicle, and switches the other flow path from the intake path to the discharge path.

7 Claims, 20 Drawing Sheets

(56) References Cited

U.S. PATENT DOCUMENTS

| | | | | |
|---|---|---|---|---|
| 5,388,423 A | * | 2/1995 | Khelifa | B60H 1/00007 237/12.3 A |
| 5,435,150 A | * | 7/1995 | Khelifa | B60H 1/00007 165/42 |
| 5,873,256 A | * | 2/1999 | Denniston | B60H 1/00414 62/244 |

FOREIGN PATENT DOCUMENTS

| | | |
|---|---|---|
| JP | 2000-071751 A | 3/2000 |
| JP | 2000-272325 A | 10/2000 |
| JP | 2000-280724 A | 10/2000 |
| JP | 2000-289455 A | 10/2000 |
| JP | 2002-200910 A | 7/2002 |
| JP | 2007-271247 A | 10/2007 |
| JP | 2010-076506 A | 4/2010 |
| JP | 2010-095154 A | 4/2010 |
| JP | 2010-266200 A | 11/2010 |

OTHER PUBLICATIONS

Extended European Search Report dated Feb. 1, 2016 for EP 12854758.

* cited by examiner

VEHICLE AIR-CONDITIONING DEVICE

TECHNICAL FIELD

The present invention relates to a vehicle air-conditioning apparatus.

BACKGROUND ART

Conventionally, as illustrated in FIG. 20, there is known sensible heat exchanger 11 that includes two flow paths A and B (respectively indicated by the solid and dashed arrows). Sensible heat exchanger 11 can move heat from one flow path A to the other flow path B when warm air flows through one flow path A and cold air flows through the other flow path B.

The heat exchanger is installed in a vehicle air-conditioning apparatus, for example, and is used to replace air inside a vehicle interior (referred to as internal air) and air outside a vehicle (referred to as external air) without discharging the heat inside the vehicle interior to the outside of the vehicle when the inside of the vehicle interior is ventilated (for example, see PTL 1).

In the vehicle air-conditioning apparatus of the related art, the flow path A and flow path B are fixedly used to let external air and internal air to pass through the flow path A and flow path B, respectively.

CITATION LIST

Patent Literature

PTL 1
Japanese Patent Application Laid-Open No. 2002-200910

SUMMARY OF INVENTION

Technical Problem

In the vehicle air-conditioning apparatus of the related art, since one of the flow paths is fixedly used to let the external air passes through in the heat exchanger as described above, condensation sometimes occurs at a position close to an external air inlet when the temperature of the external air is low. When the condensation occurs, the flow path is blocked by the condensation, and hence a problem arises in that the ventilation amount and the heat exchange efficiency of the heat exchanger are reduced.

Further, in the vehicle air-conditioning apparatus of the related art, since the intake flow path taking the external air and the exhaust flow path discharging the internal air are fixedly used in the heat exchanger, the temperature distribution of the heat exchanger becomes non-uniform when the ventilation is continuously performed. Then, when the non-uniformity of the temperature distribution increases, a problem arises in that the heat exchange efficiency of the heat exchanger is reduced.

An object of the invention is to provide a vehicle air-conditioning apparatus capable of preventing a reduction of a heat exchange efficiency of a heat exchanger caused by the condensation of the heat exchanger and the non-uniform temperature distribution of the heat exchanger.

Solution to Problem

A vehicle air-conditioning apparatus according to an aspect of the present invention includes: a heat exchanger that performs heat exchange between air passing through a first flow path and air passing through a second flow path; and a switching section that alternatively switches one of the first flow path and the second flow path from an exhaust flow path to an intake flow path and the other one of the first flow path and the second flow path from the intake flow path to the exhaust flow path, internal air from a vehicle interior being discharged to the outside of the vehicle interior through the exhaust flow path and external air from the outside of the vehicle interior being introduced into the vehicle interior through the intake flow path.

Advantageous Effects of Invention

According to the invention, the intake flow path and the exhaust flow path of the heat exchanger are alternately switched by the switching section. Accordingly, it is possible to prevent the inside of the flow path of the heat exchanger from being condensed and to avoid the temperature distribution of the heat exchanger from becoming largely non-uniform. Accordingly, it is possible to prevent a reduction of the heat exchange efficiency of the heat exchanger caused by the occurrence of the condensation or the non-uniformity of the temperature distribution.

DESCRIPTION OF EMBODIMENTS

Hereinafter, embodiments of the invention will be described in detail with reference to the drawings.

Embodiment 1

Figure 1:
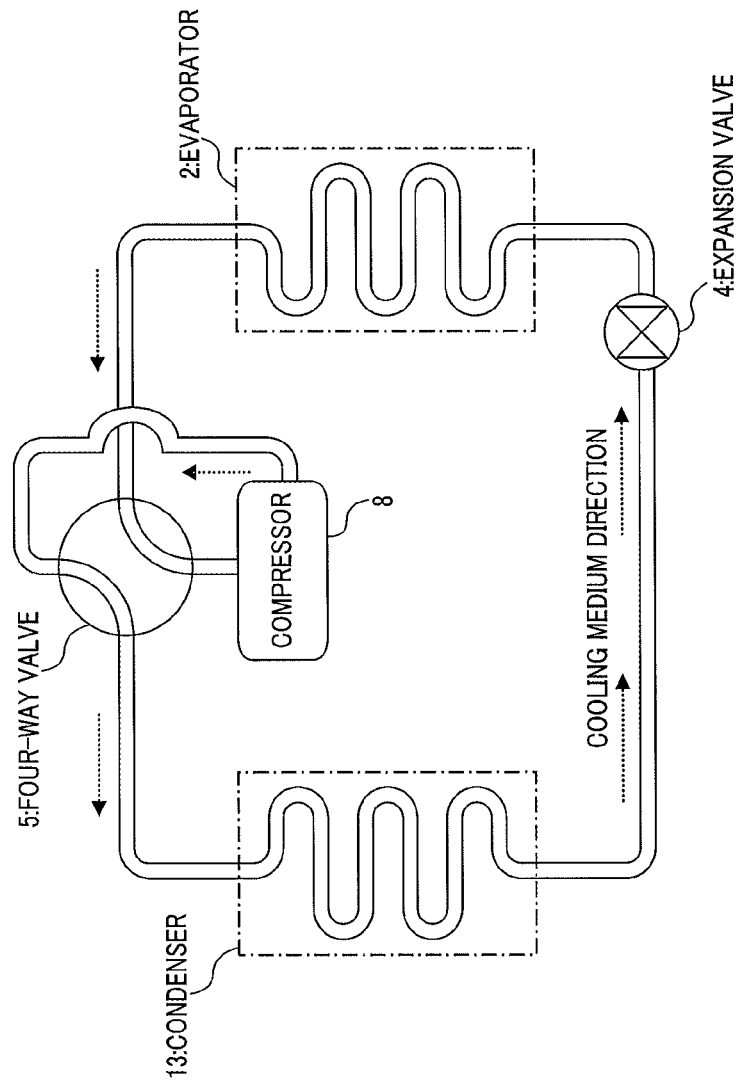
FIG. 1 is a configuration diagram illustrating a heat pump part of an air-conditioning apparatus of an embodiment of the invention.
Figure 2:
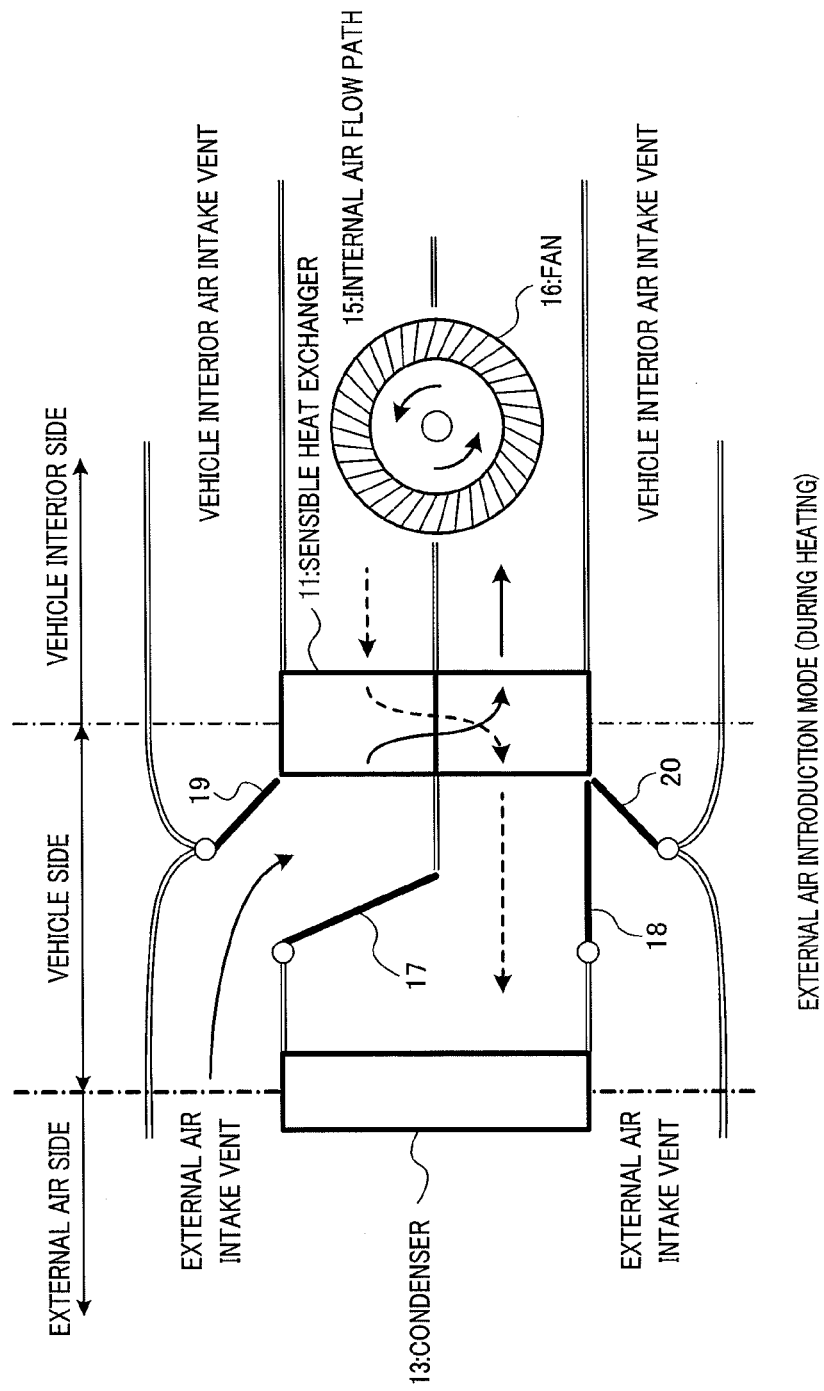
FIG. 2 is a configuration diagram illustrating a ventilation facility of an air-conditioning apparatus of Embodiment 1.

FIG. 1 is a configuration diagram illustrating a heat pump part of an air-conditioning apparatus of an embodiment of the invention, and FIG. 2 is a configuration diagram illustrating a ventilation facility of an air-conditioning apparatus of Embodiment 1.

The air-conditioning apparatus of the embodiment includes the heat pump having a configuration illustrated in FIG. 1 and the ventilation facility illustrated in FIG. 2.

The heat pump is equipped with compressor 8 that compresses a cooling medium, condenser 13 that liquefies the cooling medium, evaporator 2 that evaporates the cooling medium, and expansion valve 4 that depressurizes the cooling medium. Further, the heat pump is equipped with four-way valve 5 that switches the cooling medium flowing direction in order to switch between a cooling operation and a heating operation.

The ventilation facility includes sensible heat exchanger 11 as a heat exchanger, two internal air flow paths 15 in communication with a vehicle interior, fan 16 that causes air to flow through two internal air flow paths 15, switching valves 17 and 18, and opening valves 19 and 20.

Figure 19:
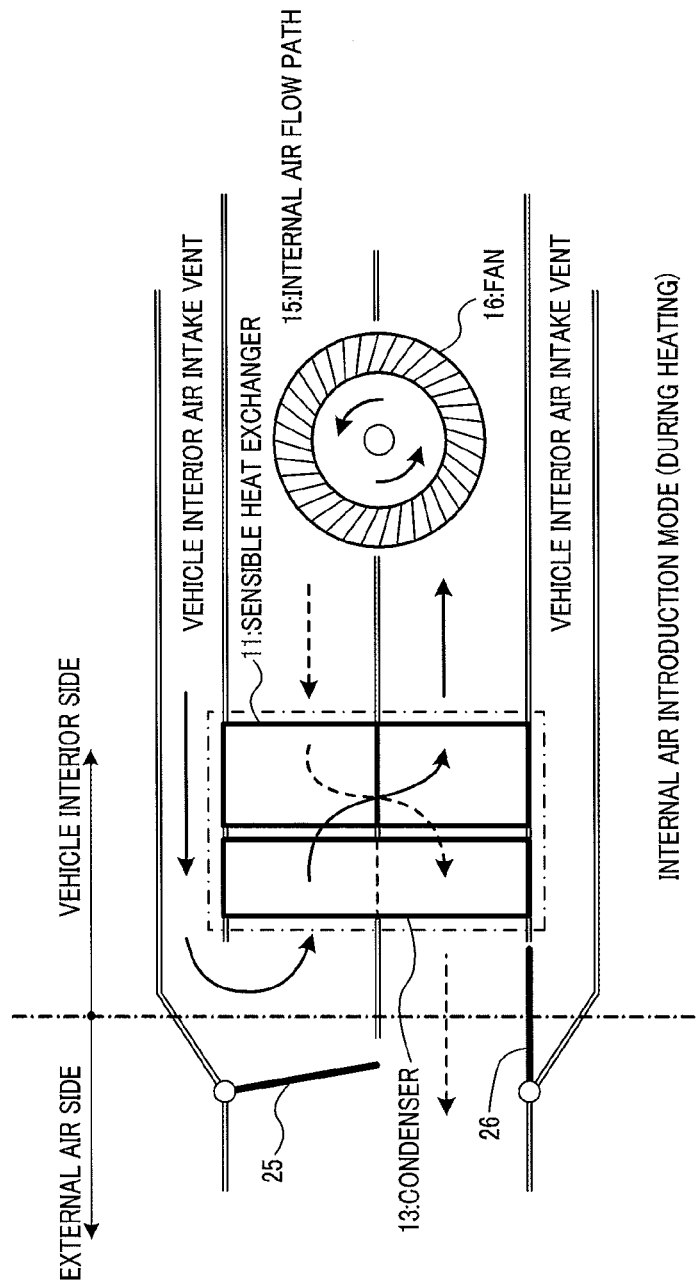
FIG. 19 is a diagram illustrating a second operation example of the internal air introduction mode of the ventilation facility of Embodiment 5.
Figure 20:
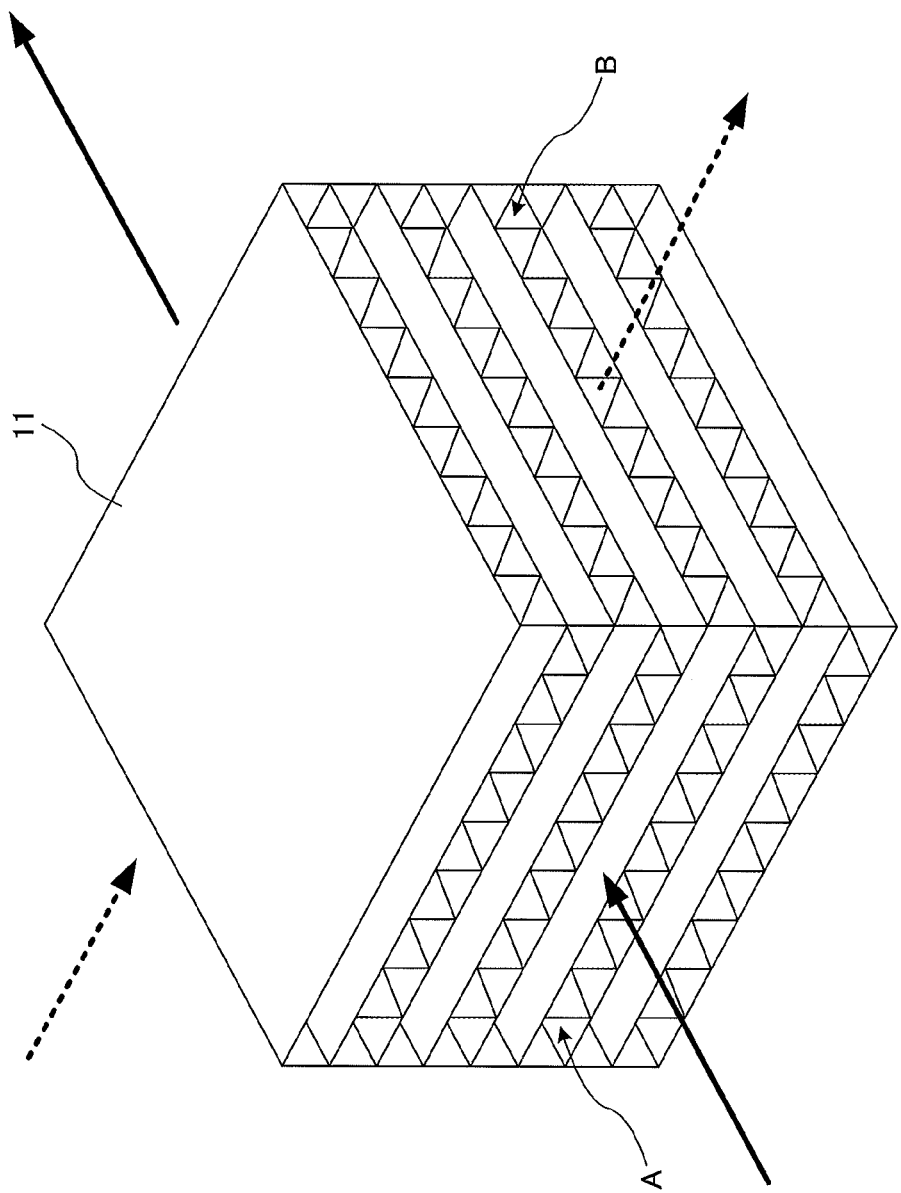
FIG. 20 is a perspective view illustrating a configuration of a heat exchanger.

As illustrated in FIG. 20 as well, sensible heat exchanger 11 includes therein a first flow path (A) and a second flow path (B), and causes air to flow to each of the flow paths while moving heat from one flow path to the other flow path when warm air flows through one flow path and cold air flows through the other flow path. The first flow path and the second flow path are respectively indicated by the solid line and the dotted line in FIGS. 2 to 19. By the above-described action, in a case where the inside of the vehicle interior is warm and the outside of the vehicle interior is cold, the air inside the vehicle interior (referred to as the internal air) can be ventilated by the air outside the vehicle (referred to as the external air) while the heat inside the vehicle interior remains without being discharged to the outside of the vehicle interior significantly. Here, the heat exchange efficiency is about 70%, and the temperature of the exhaust air from sensible heat exchanger 11 is higher than that of the external air.

The first flow path and the second flow path of sensible heat exchanger 11 are respectively connected to two internal air flow paths 15.

Switching valve 17 is a valve that switches a connection destination of the first flow path of sensible heat exchanger 11 between the intake vent (the external air intake vent or the vehicle interior air intake vent) and the flow path connected to condenser 13.

Switching valve 18 is a valve that switches a connection destination of the second flow path of sensible heat exchanger 11 between the intake vent (the external air intake vent or the vehicle interior air intake vent) and the flow path communicating with condenser 13.

Opening valve 19 is a valve that switches between the opened state and the closed state of the vehicle interior air intake vent with respect to the intake side of the first flow path of sensible heat exchanger 11. Opening valve 20 is a valve that switches between the opened state and the closed state of the vehicle interior air intake vent with respect to the intake side of the second flow path of sensible heat exchanger 11.

Various valves including switching valves 17 and 18 and opening valves 19 and 20 may be opened and closed by an actuator in an electric control manner or may be opened and closed in a mechanical control manner. Further, a configuration may be employed in which sensors for detecting a temperature, humidity, cloudiness, and the like are provided and a controller determines the state of various valves appropriate for the vehicle environment based on the sensor output. Then, the controller may be configured to control the operation of various valves in an electric control manner. The same applies to various valves of Embodiments 2 to 5.

Evaporator 2 and an interior condenser (not illustrated) are disposed at the inner end of internal air flow path 15. The interior condenser has a configuration different from condenser 13, and is used to heat the air dehumidified by evaporator 2 during the dehumidification and heat operation. This configuration is the same even in the air-conditioning apparatuses of Embodiments 2 to 5 to be described hereinafter. Furthermore, evaporator 2 and the interior condenser may be disposed in a different manner.

The ventilation facility of Embodiment 1 can be applied to not only a hybrid vehicle in which condenser 13 needs to be disposed at the front side of the vehicle, but also an electric vehicle in which the flexibility in placement of condenser 13 is high. In the hybrid vehicle, since a radiator is disposed at the front side of the vehicle and condenser 13 needs to close to the radiator, condenser 13 needs to be disposed at the front side of the vehicle.

[Operation of External Air Introduction Mode]

Figure 3:
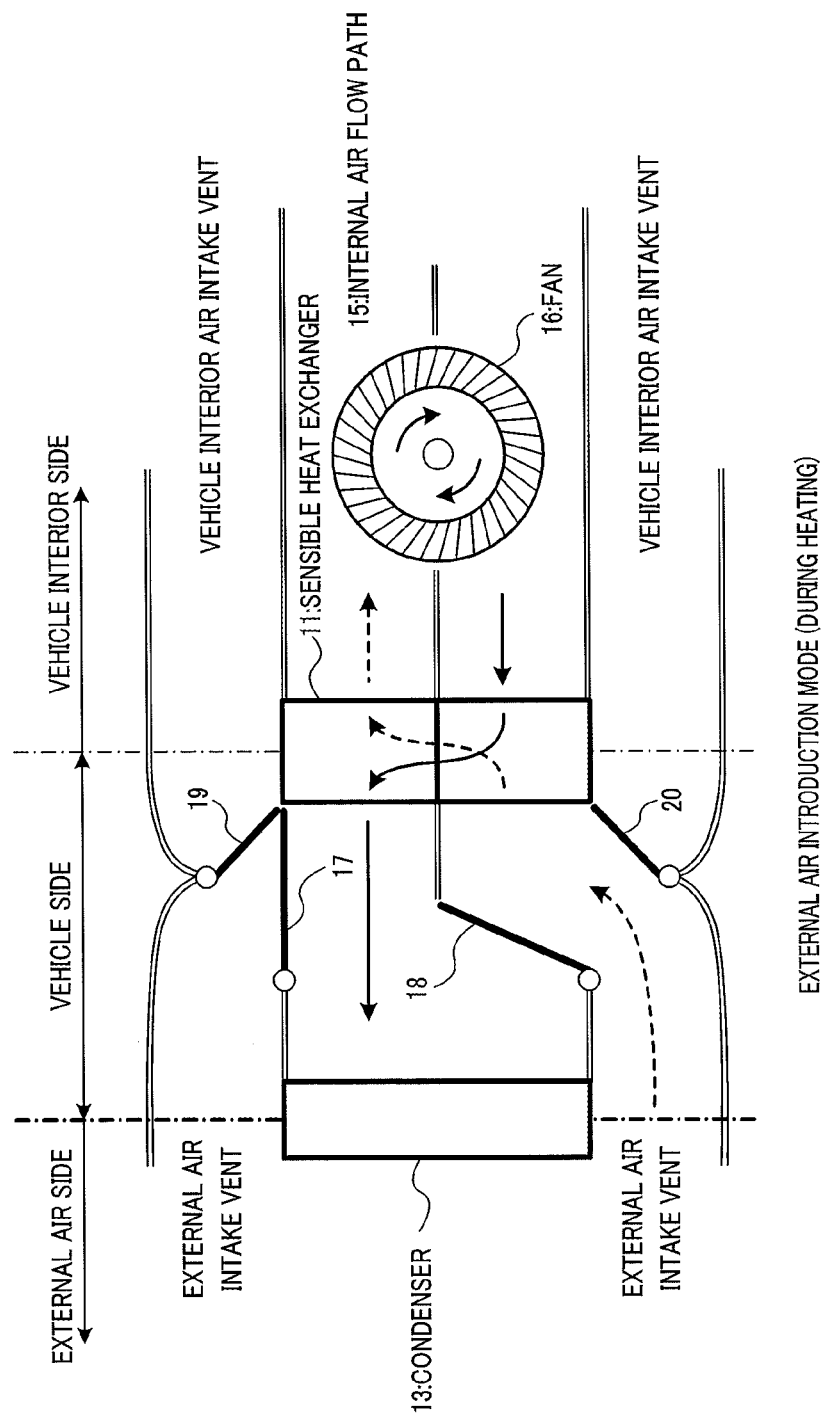
FIG. 3 is a diagram illustrating an operation example of an external air introduction mode of the ventilation facility of Embodiment 1.

FIG. 3 is a diagram illustrating an operation example of an external air introduction mode of the ventilation facility of Embodiment 1.

In the ventilation facility of Embodiment 1, in a case where the heat operation of the heat pump and the ventilation inside the vehicle interior by the external air are performed, the switching of switching valves 17 and 18 and the switching of the blowing direction of fan 16 are intermittently repeated (for example, at a predetermined interval or a timing according to the device or the peripheral environment) as illustrated in FIGS. 2 and 3.

By such an operation, the external air and the internal air are switched through sensible heat exchanger 11 while the intake flow path and the exhaust flow path of sensible heat exchanger 11 are alternately switched. Further, the air discharged through sensible heat exchanger 11 (that is, the exhaust air having a temperature higher than that of the external air) is sent into condenser 13.

[Operation of Internal Air Introduction Mode]

Figure 4:
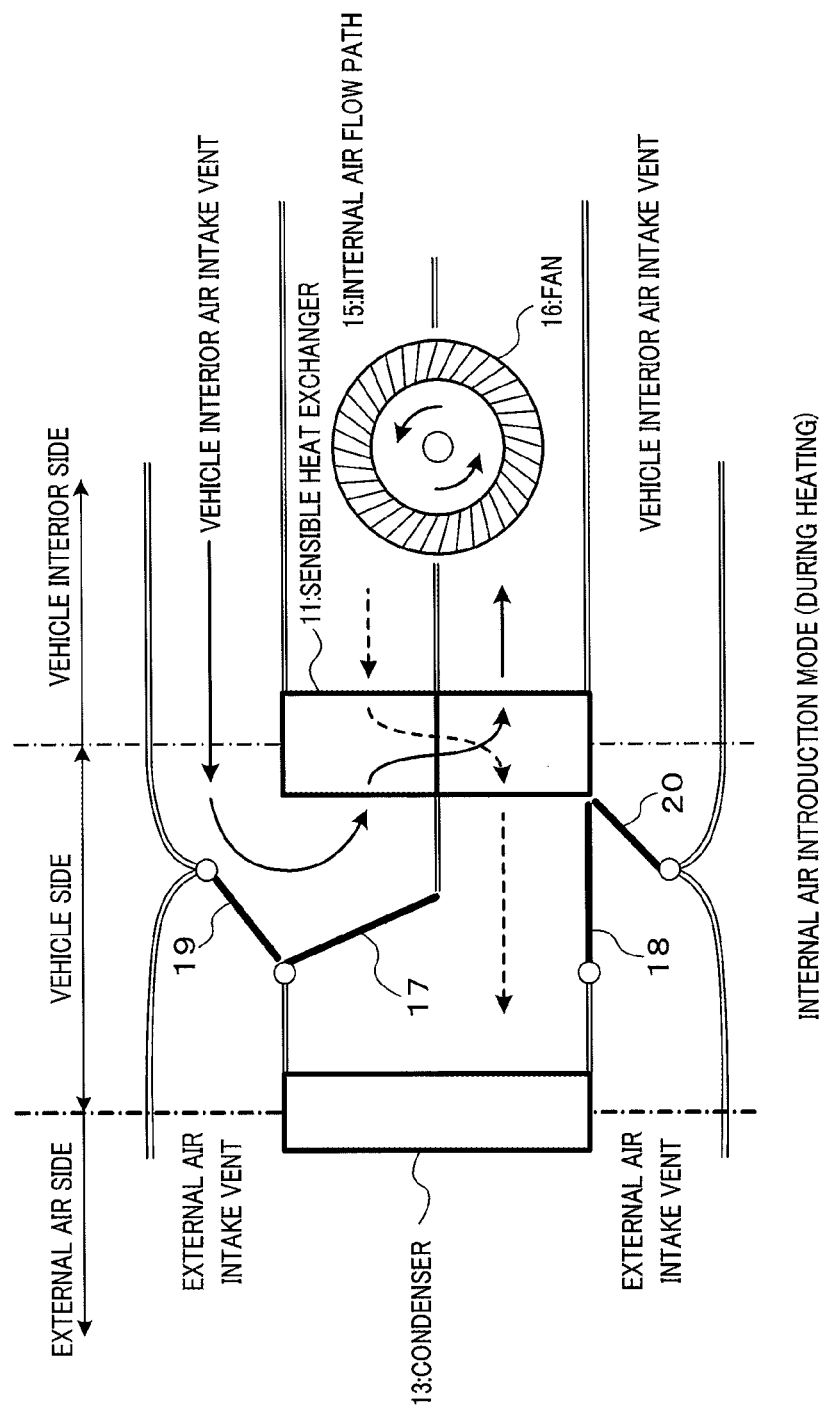
FIG. 4 is a diagram illustrating a first operation example of an internal air introduction mode of the ventilation facility of Embodiment 1.
Figure 5:
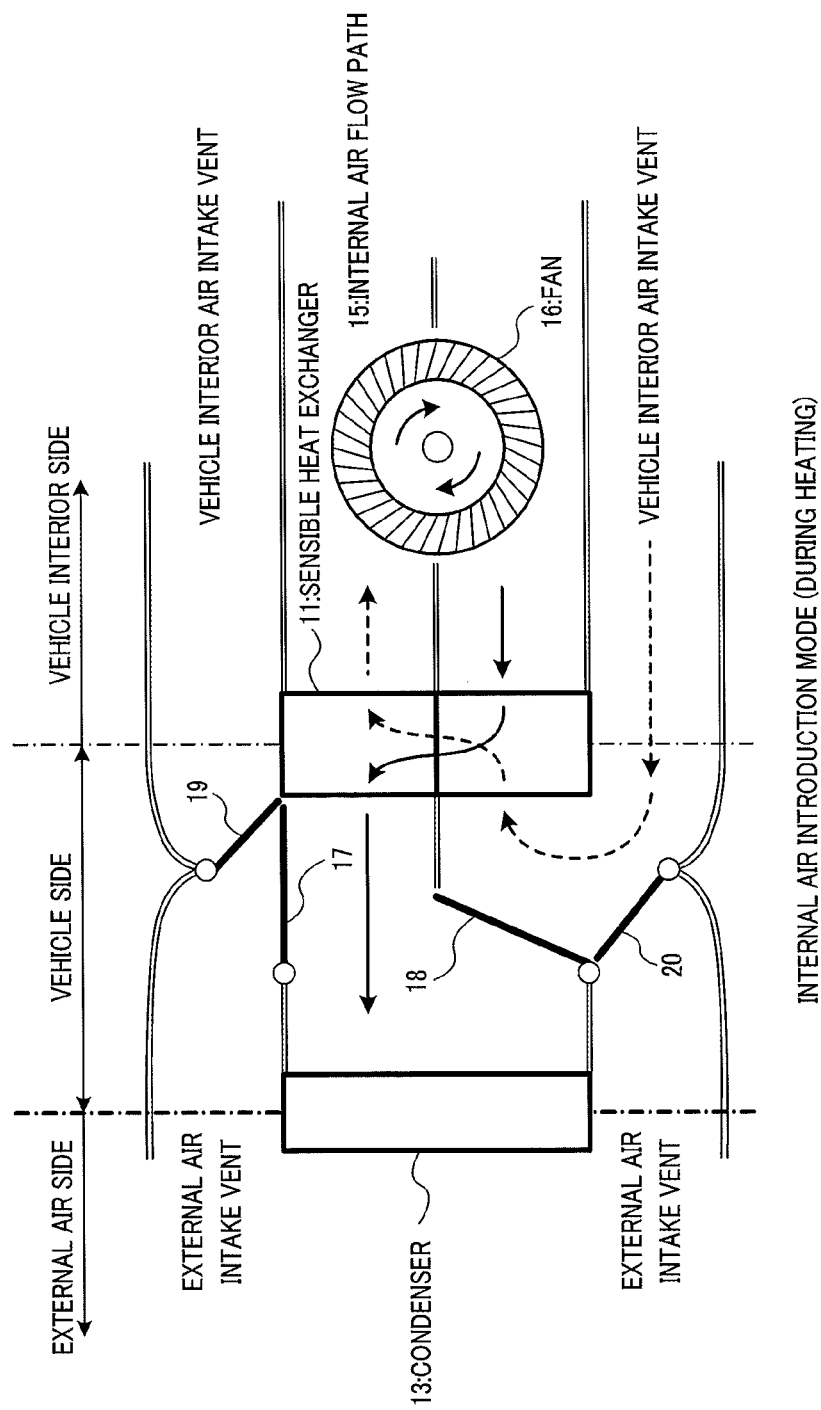
FIG. 5 is a diagram illustrating a second operation example of the internal air introduction mode of the ventilation facility of Embodiment 1.

FIGS. 4 and 5 are diagrams illustrating first and second operation examples of an internal air introduction mode of the ventilation facility of Embodiment 1.

The internal air introduction mode is an operation mode in which opening valves 19 and 20 are opened at an appropriate timing so that the entire air taken into sensible heat exchanger 11 becomes the air inside the vehicle interior or the air inside the vehicle interior is included in the air taken into sensible heat exchanger 11 by a predetermined ratio.

In the internal air introduction mode, when switching valve 17 connects the first flow path of sensible heat exchanger 11 to the intake vent as illustrated in FIG. 4, opening valve 19 is switched to open the vehicle interior air intake vent.

Further, in the internal air introduction mode, when switching valve 18 connects the second flow path of sensible heat exchanger 11 to the intake vent as illustrated in FIG. 5, opening valve 20 is switched to open the vehicle interior air intake vent.

Then, the state of FIG. 4 and the state of FIG. 5 are switched intermittently and repeatedly.

By such an operation, the internal air is circulated through sensible heat exchanger 11 while the intake flow path and the exhaust flow path of sensible heat exchanger 11 are alternately switched. Further, the air discharged through sensible heat exchanger 11 is sent to condenser 13.

Furthermore, since the humidity inside the vehicle interior increases when the internal air introduction mode is maintained for a long period of time, the internal air introduction mode may be performed together with the external air introduction mode.

Further, in the internal air introduction mode, opening valves 19 and 20 may not be entirely opened to the vehicle interior air intake vent, but both the external air intake vent and the vehicle interior air intake vent may be opened to the intake vent of sensible heat exchanger 11 by a predetermined ratio. In this case, the low-temperature external air and the high-temperature internal air may be taken into sensible heat exchanger 11 while being mixed using a predetermined ratio. However, in this case, the external air intake vent and the vehicle interior air intake vent need to be maintained in a negative pressure state so that the external air does not directly flow from the external air intake vent to the vehicle interior air intake vent.

[Effect]

According to the air-conditioning apparatus of Embodiment 1, the exhaust air flow path and the intake air flow path of sensible heat exchanger 11 are alternately switched in the external air introduction mode. Accordingly, it is possible to prevent the inside of the flow path of sensible heat exchanger 11 from being condensed and frozen and to prevent the temperature distribution of sensible heat exchanger 11 from becoming largely non-uniform. Accordingly, it is possible to prevent a problem in which the heat exchange efficiency of sensible heat exchanger 11 is reduced due to the occurrence of the condensation or the non-uniformity of the temperature distribution.

Further, according to the air-conditioning apparatus of Embodiment 1, it is possible to stably send the exhaust air having a remaining heat to condenser 13 by sensible heat exchanger 11 whose heat exchange efficiency is appropriately maintained in the external air introduction mode. That is, it is possible to transmit the heat of the exhaust air of sensible heat exchanger 11, which is uselessly wasted in the past, to condenser 13. Thus, in a case where the temperature is not so low because of the heat of the exhaust air, the frost formation of condenser 13 may be prevented or condenser 13 may be defrosted. Further, even in a case where prevention of frost formation of condenser 13 or the defrosting process thereof is performed by the other means such as a heater due to a low temperature, the power consumption may be reduced by the amount of the heat of the exhaust air.

Further, according to the air-conditioning apparatus of Embodiment 1, since the air which is warmer than the external air may be sent to condenser 13 in the external air introduction mode, a large amount of heat may be supplied to the cooling medium passing through condenser 13. Accordingly, the heating ability of the heat pump may be improved.

Further, according to the air-conditioning apparatus of Embodiment 1, only the internal air having a high temperature may flow to sensible heat exchanger 11 in the internal air introduction mode. Thus, it is possible to prevent a situation where sensible heat exchanger 11 is extremely cooled by the external air and hence the heat exchange efficiency is reduced.

Accordingly, according to the air-conditioning apparatus of Embodiment 1, it is possible to appropriately control the heat exchange between the inside of the vehicle interior and the outside of the vehicle by stably operating sensible heat exchanger 11 and the heat pump. Further, it is also possible to appropriately control the humidity exchange between the inside of the vehicle interior and the outside of the vehicle by stably operating the heat pump.

Embodiment 2

Figure 6:
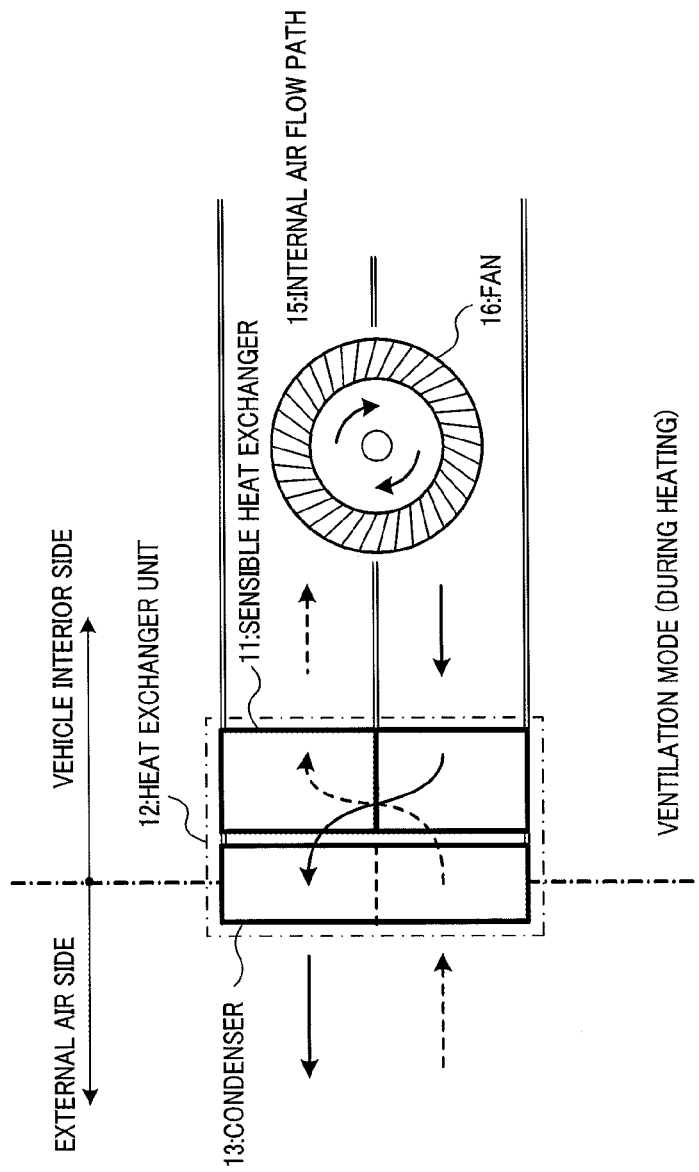
FIG. 6 is a configuration diagram illustrating a ventilation facility of an air-conditioning apparatus of Embodiment 2.
Figure 7:
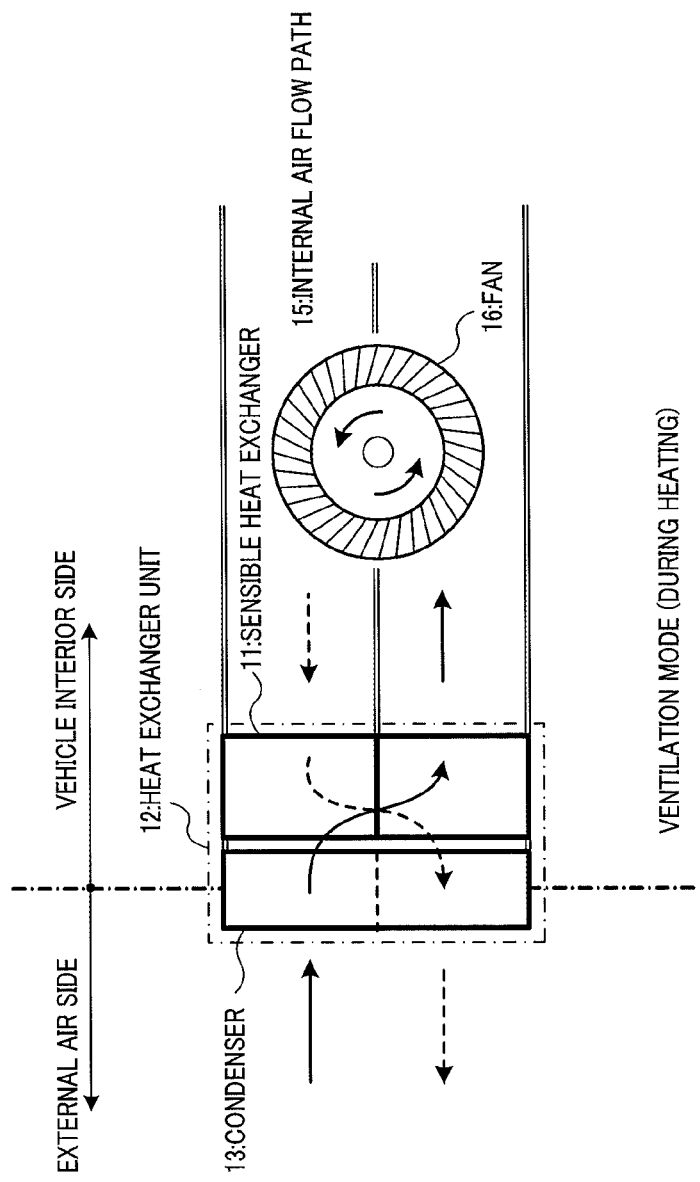
FIG. 7 is a diagram illustrating an operation example of the ventilation facility of Embodiment 2.

FIG. 6 is a configuration diagram illustrating a ventilation facility of an air-conditioning apparatus of Embodiment 2. FIG. 7 is a diagram illustrating an operation example of the ventilation facility of Embodiment 2.

The ventilation facility of Embodiment 2 has a configuration in which sensible heat exchanger 11 and condenser 13 are disposed in a close state so as to be configured as a unit corresponding to heat exchanger unit 12.

Heat exchanger unit 12 has a configuration in which the flow path inside condenser 13 is divided into two compartments, the flow path of one compartment is connected to the first flow path of sensible heat exchanger 11, and the flow path of the other compartment inside condenser 13 is connected to the second flow path of sensible heat exchanger 11. The flow path of condenser 13 is formed so that the air flowing through the flow paths of two compartments is barely mixed with each other inside condenser 13.

The ventilation facility of Embodiment 2 has a configuration in which the first flow path and the second flow path of sensible heat exchanger 11 of heat exchanger unit 12 are respectively connected to two internal air flow paths 15 and one end side of condenser 13 is connected to the external air side flow path passing through the outside of the vehicle. Fan 16 has the same configuration as that of Embodiment 1.

The ventilation facility of Embodiment 2 is applied to the electric vehicle having a high flexibility in placement of condenser 13. The same applies to the ventilation facilities of Embodiments 3 to 5 below.

[Operation of Ventilation Mode]

In the ventilation facility of Embodiment 2, in a case where the heat operation of the heat pump and the ventilation inside the vehicle interior by the external air are performed, the blowing direction of fan 16 is switched so as to be intermittently and repeatedly inversed as illustrated in FIGS. 6 and 7.

By such an operation, the external air and the internal air may be replaced through sensible heat exchanger 11 while the intake flow path and the exhaust flow path of sensible heat exchanger 11 are alternately switched. Further, the air that is discharged through sensible heat exchanger 11 (that is, the exhaust air that has a temperature higher than that of the external air) is alternately sent to two compartments of the flow path of condenser 13.

Furthermore, in the air-conditioning apparatus of Embodiment 2, the timing of inversing the blowing direction may be, for example, a timing of a predetermined interval or a timing according to the situation of the apparatus through detection of the situation of the apparatus by a sensor or the like. For example, when a temperature sensor is provided in each compartment of condenser 13 and the temperature of one of the compartments decreases based on the temperature detected by the temperature sensor, a control section may switch the blowing direction so that the exhaust air is sent to the compartment. The same applies to Embodiments 3 to 5.

[Effect]

Accordingly, according to the air-conditioning apparatus of Embodiment 2, since the exhaust air flow path and the intake air flow path of sensible heat exchanger 11 are alternately switched, it is possible to prevent the inside of the flow path of sensible heat exchanger 11 from being condensed and frozen and to prevent the temperature distribution of sensible heat exchanger 11 from becoming largely non-uniform. Accordingly, it is possible to prevent a situation where the heat exchange efficiency of sensible heat exchanger 11 is reduced due to the occurrence of the condensation or the non-uniformity of the temperature distribution.

Further, according to the air-conditioning apparatus of Embodiment 2, it is possible to stably send the exhaust air having a remaining heat to condenser 13 by sensible heat exchanger 11 whose heat exchange efficiency is appropriately maintained. That is, it is possible to transmit the heat of the exhaust air of sensible heat exchanger 11, which is uselessly wasted in the past, to condenser 13. Thus, in a case where the temperature is not so low because of the heat of the exhaust air, the frost formation of condenser 13 can be prevented or condenser 13 can be defrosted. Further, even in a case where prevention of the frost formation of condenser 13 or the defrosting process thereof is performed by the other means such as a heater due to the low temperature, the power consumption may be reduced by the amount of the heat of the exhaust air.

Further, according to the air-conditioning apparatus of Embodiment 2, since a long flow path is not interposed between sensible heat exchanger 11 and condenser 13, the heat of the exhaust air does not escape to the other part, and the heat of the exhaust air may be directly transmitted to condenser 13.

Embodiment 3

Figure 8:
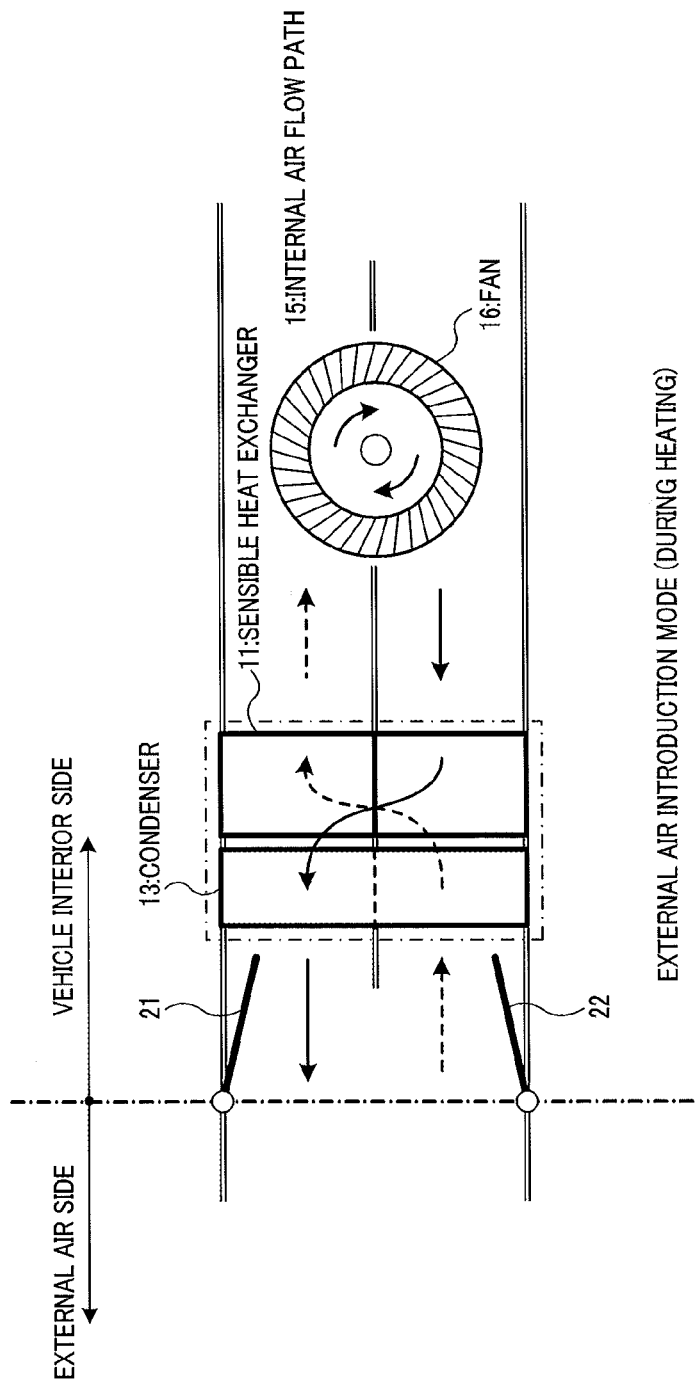
FIG. 8 is a configuration diagram illustrating a ventilation facility of an air-conditioning apparatus of Embodiment 3.

FIG. 8 is a configuration diagram illustrating a ventilation facility of an air-conditioning apparatus of Embodiment 3.

The ventilation facility of Embodiment 3 has a configuration in which opening-closing valves 21 and 22 are additionally provided in the ventilation facility of Embodiment 2.

Opening-closing valves 21 and 22 are valves that are provided inside the flow path so as to open and close the flow path extending from condenser 13 to the outside of the vehicle.

Accordingly, in the ventilation facility of Embodiment 3, when opening-closing valves 21 and 22 are closed, the positions of opening-closing valves 21 and 22 become the boundary between the vehicle interior side and the external air side.

[Operation of External Air Introduction Mode]

Figure 9:
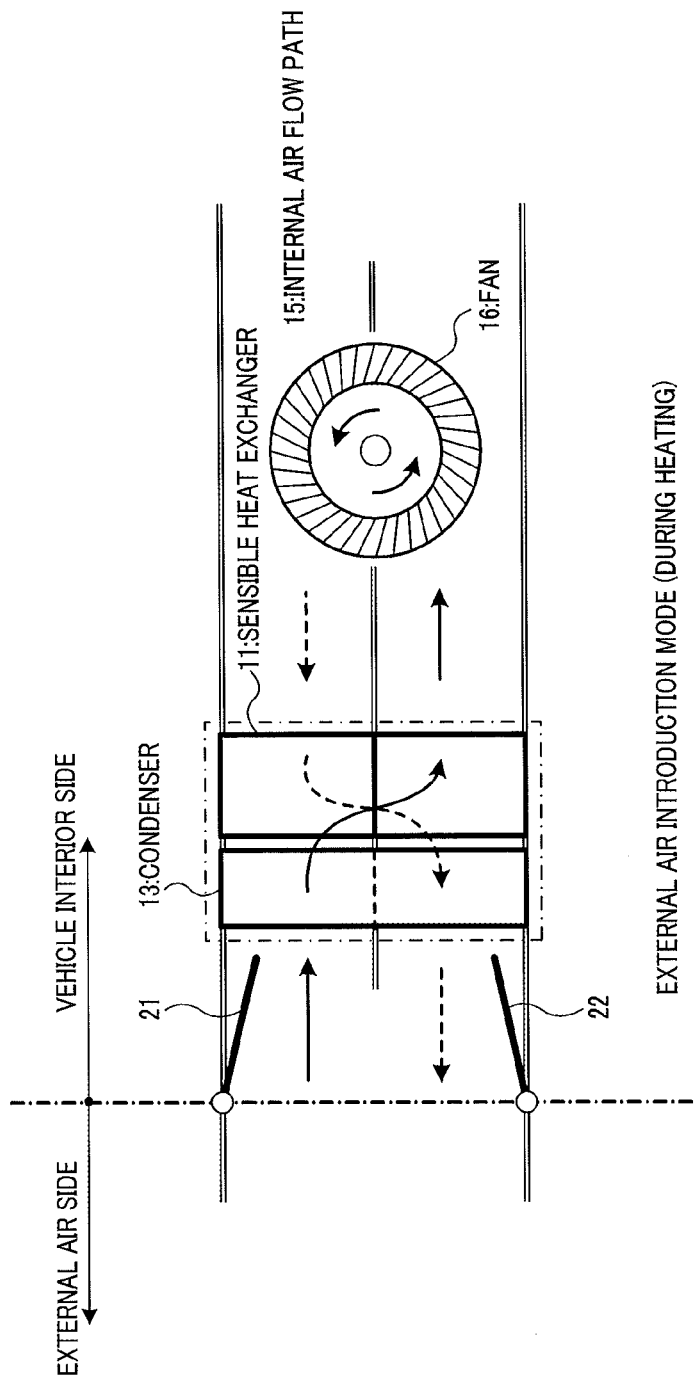
FIG. 9 is a diagram illustrating an operation example of an external air introduction mode of the ventilation facility of Embodiment 3.

FIG. 9 is a diagram illustrating an operation example of an external air introduction mode of a ventilation facility of Embodiment 3.

In the external air introduction mode, opening-closing valves 21 and 22 are normally opened as illustrated in FIGS. 8 and 9. The operation and action in this case are the same as those of the ventilation mode of the ventilation facility of Embodiment 2.

[Operation of Internal Air Circulation Mode]

Figure 10:
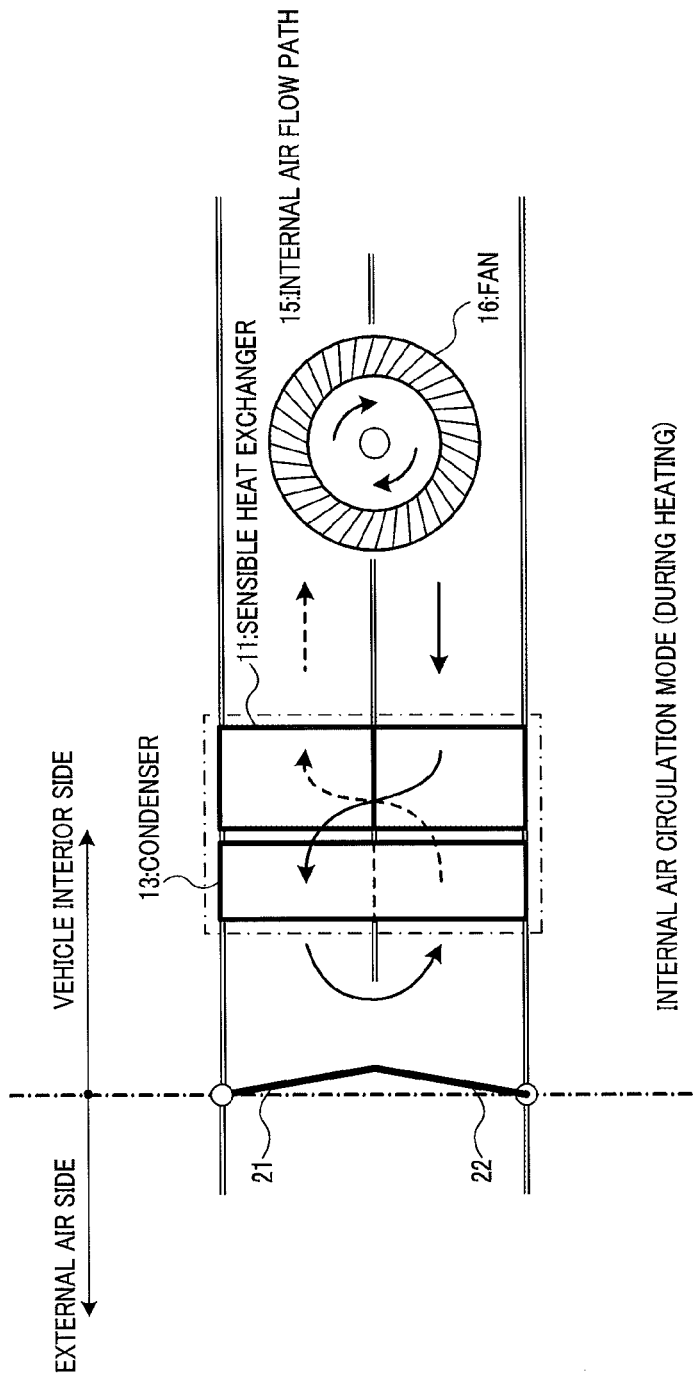
FIG. 10 is a diagram illustrating a first operation example of an internal air circulation mode of the ventilation facility of Embodiment 3.
Figure 11:
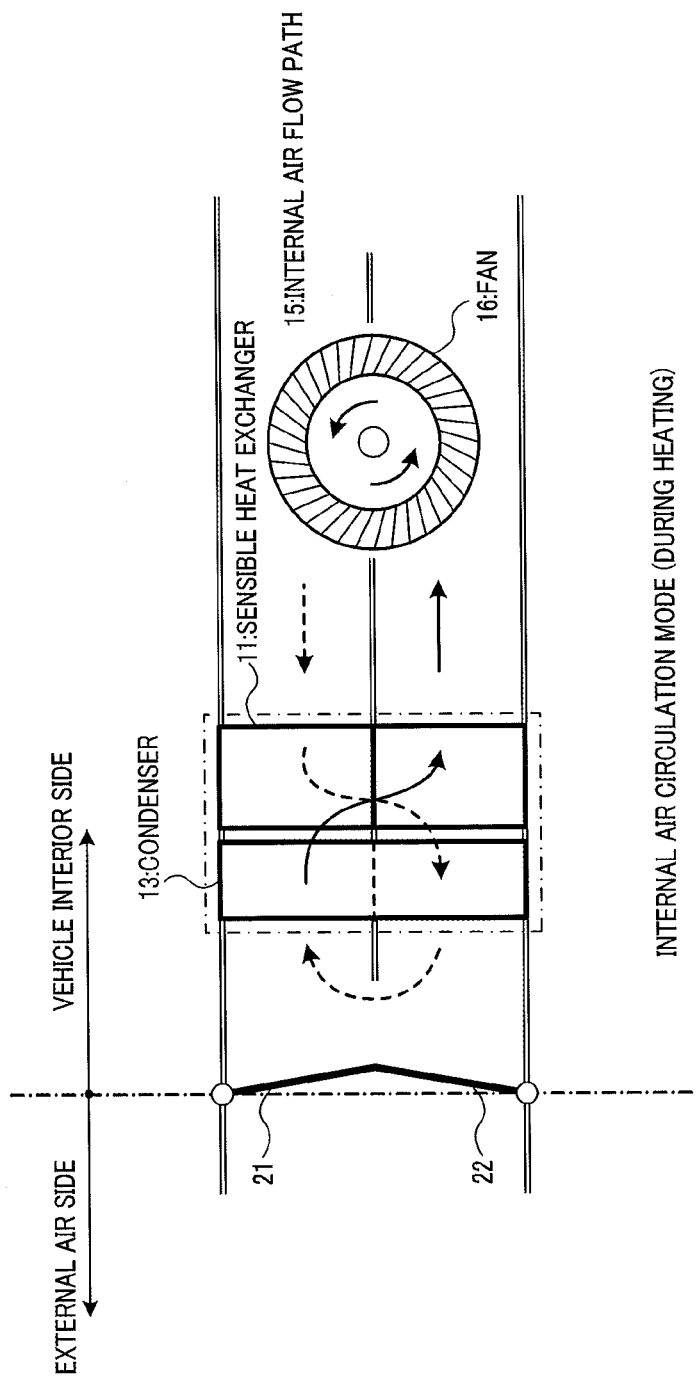
FIG. 11 is a diagram illustrating a second operation example of the internal air circulation mode of the ventilation facility of Embodiment 3.

FIGS. 10 and 11 are diagrams illustrating first and second operation examples of an internal air circulation mode of the ventilation facility of Embodiment 3.

In the internal air circulation mode, opening-closing valves 21 and 22 may be switched to the closed state as illustrated in FIGS. 10 and 11. Further, in a state where opening-closing valves 21 and 22 are normally closed, the blowing direction of fan 16 is switched so as to be intermittently (for example, at every predetermined interval) and repeatedly inversed.

By such an operation, in the ventilation facility of Embodiment 3, the internal air which is taken from one of two internal air flow paths 15 passes through one flow path of sensible heat exchanger 11 and one compartment of condenser 13, and changes the direction back to the origin at the front side of opening-closing valves 21 and 22. Then, the internal air that has changed the direction back to the origin passes through the other compartment of condenser 13 and the other flow path of sensible heat exchanger 11, and is returned into the vehicle interior through the other of internal air flow paths 15.

Further, when the blowing direction of fan 16 is inversed, the flow of the internal air passing through internal air flow path 15, sensible heat exchanger 11, and condenser 13 is also inversed.

Furthermore, since the humidity inside the vehicle interior increases when the internal air circulation mode is maintained for a long period of time, the internal air circulation mode may be performed together with the external air introduction mode.

[Effect]

According to the air-conditioning apparatus of Embodiment 3, the same operation and action as those of Embodiment 2 may be obtained by the operation of the external air introduction mode. Further, even when the temperature of the external air is extremely low, the high-temperature internal air may be sent to condenser 13 by the operation of the internal air circulation mode, and hence the frost formation of condenser 13 may be prevented or the defrosting process thereof may be performed. Further, such an internal air circulation mode may be generated by a simple process of closing opening-closing valves 21 and 22. Moreover, since such an internal air circulation mode may increase the air-tightness inside the vehicle interior, the temperature inside the vehicle interior may be maintained.

In addition, since the external air is interrupted in the internal air circulation mode, a large amount of heat may be supplied to the cooling medium passing through condenser 13. Accordingly, the heating ability of the heat pump may be improved.

Embodiment 4

Figure 12:
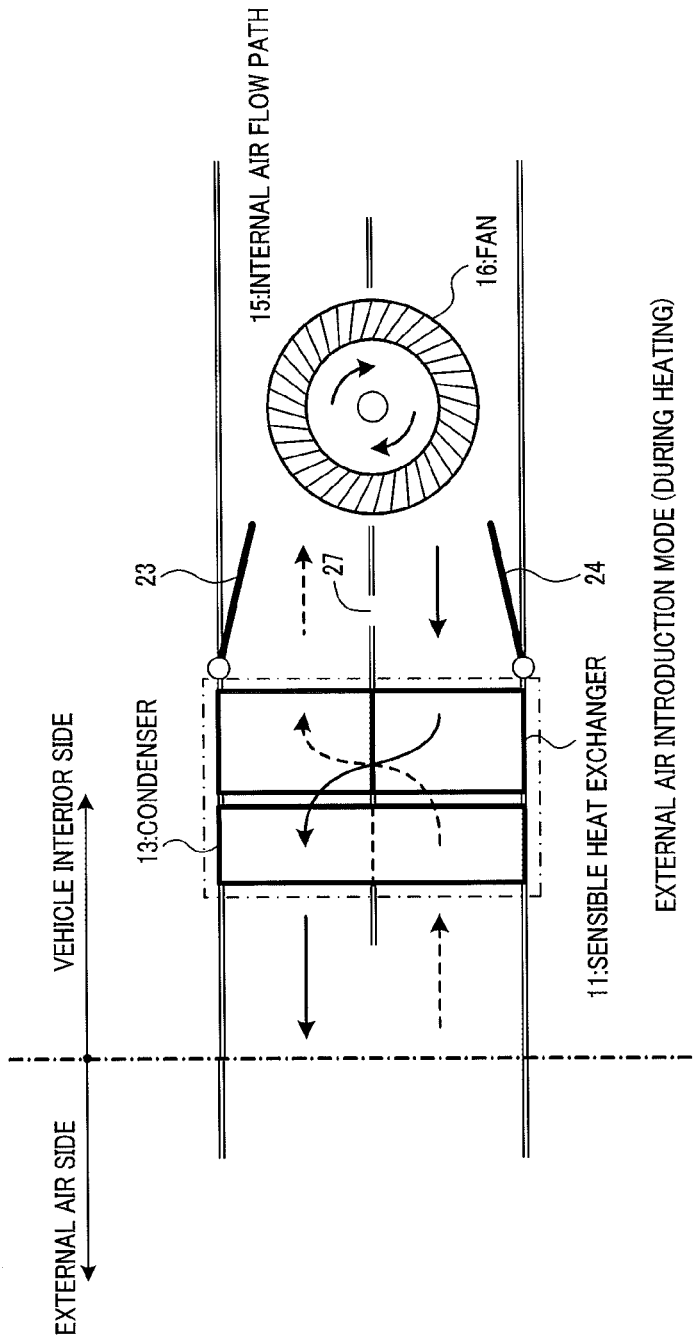
FIG. 12 is a configuration diagram illustrating a ventilation facility of an air-conditioning apparatus of Embodiment 4.

FIG. 12 is a configuration diagram illustrating a ventilation facility of an air-conditioning apparatus of Embodiment 4.

The ventilation facility of Embodiment 4 has a configuration in which opening-closing valves 23 and 24 and bypass flow path 27 are additionally provided in the ventilation facility of Embodiment 2.

Opening-closing valves 23 and 24 are valves that switch the closed state and the opened state of internal air flow path 15 between sensible heat exchanger 11 and fan 16.

Bypass flow path 27 is a flow path that opens two internal air flow paths 15, and is installed near fan 16 as compared to opening-closing valves 23 and 24 while opening-closing valves 23 and 24 are closed.

[Operation of External Air Introduction Mode]

Figure 13:
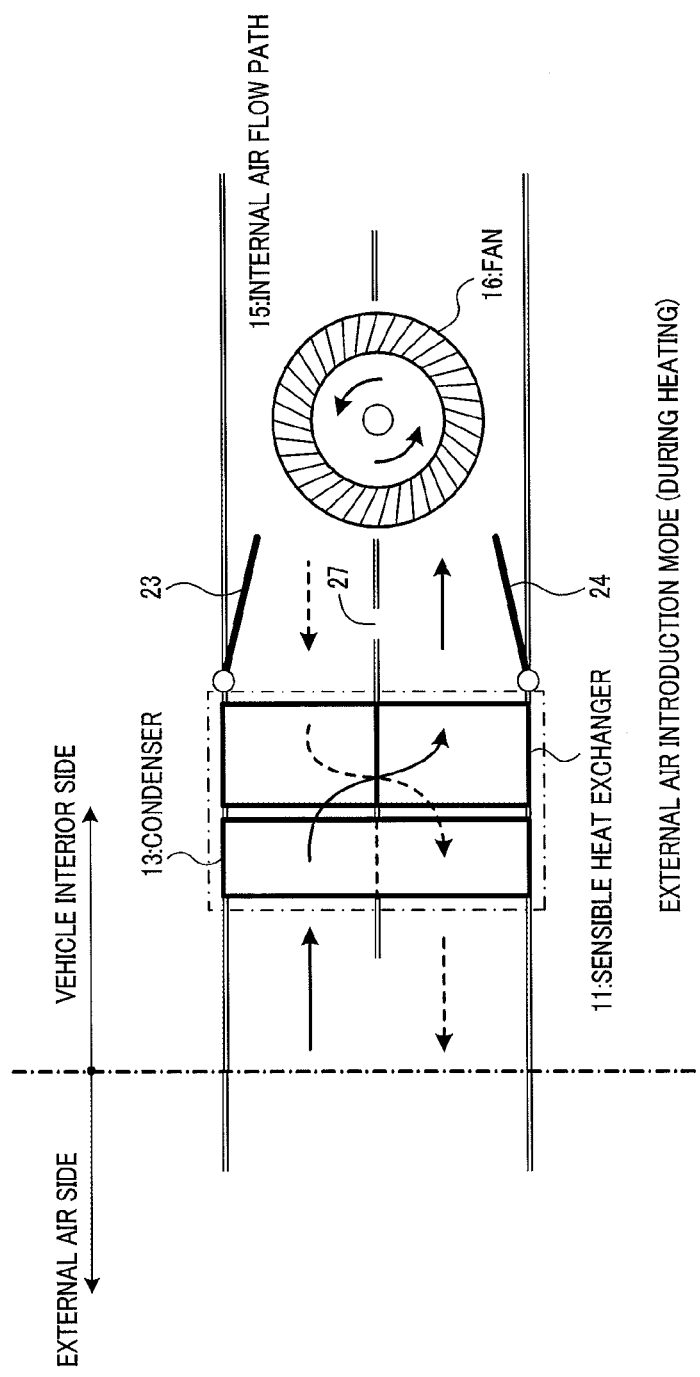
FIG. 13 is a diagram illustrating an operation example of an external air introduction mode of the ventilation facility of Embodiment 4.

FIG. 13 is a diagram illustrating an operation example of an external air introduction mode of a ventilation facility of Embodiment 4.

In the external air introduction mode, opening-closing valves 23 and 24 are always opened as illustrated in FIGS. 12 and 13. The operation and action in this case are substantially the same as those of the ventilation mode of the ventilation facility of Embodiment 2.

Furthermore, in the external air introduction mode, a part of the air of internal air flow path 15 is circulated through bypass flow path 27. Furthermore, when there is a need to completely stop the circulation, a valve opening and closing bypass flow path 27 may be provided so as to close bypass flow path 27.

[Operation of Internal Air Circulation Mode]

Figure 14:
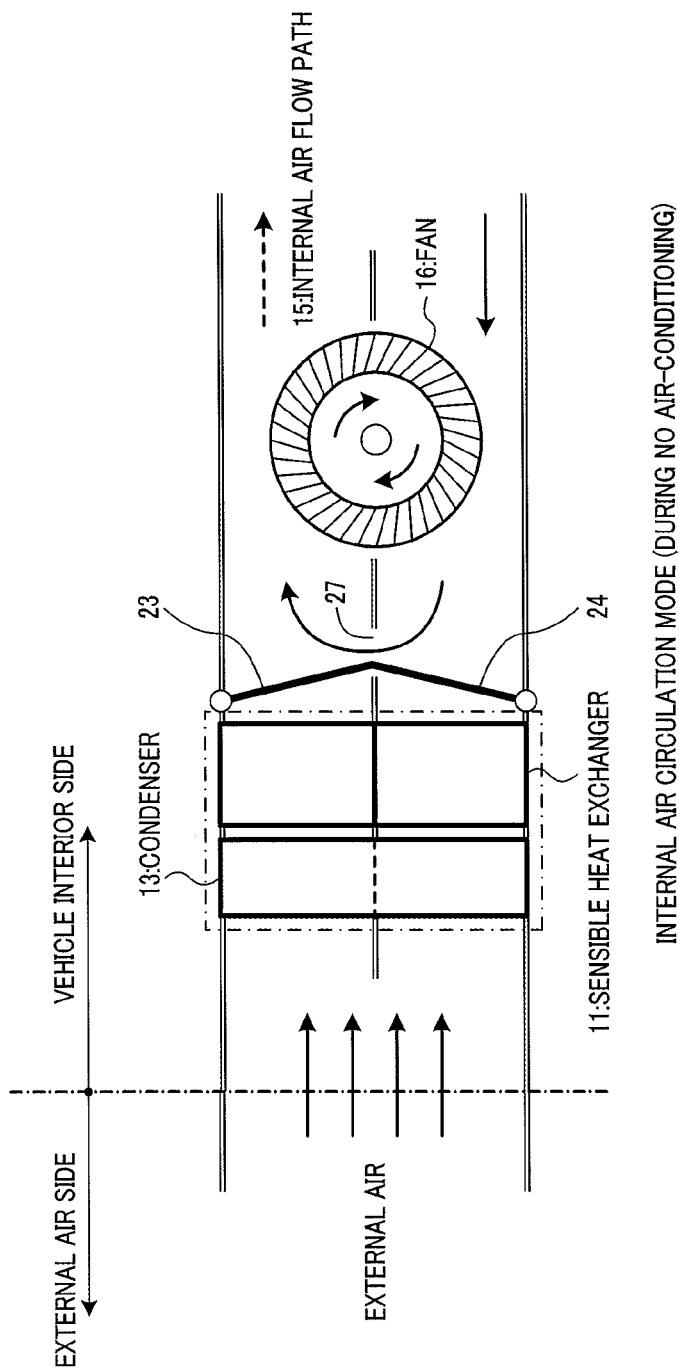
FIG. 14 is a diagram illustrating a first operation example of an internal air circulation mode of the ventilation facility of Embodiment 4.
Figure 15:
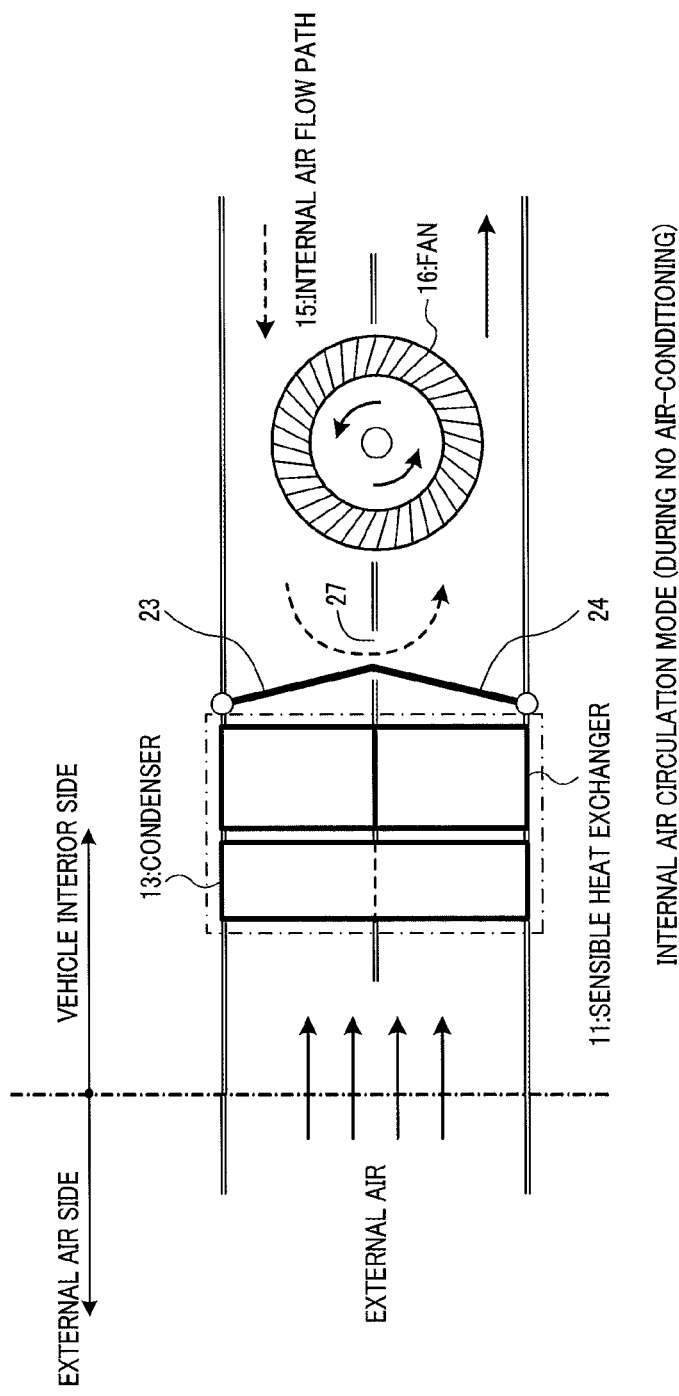
FIG. 15 is a diagram illustrating a second operation example of the internal air circulation mode of the ventilation facility of Embodiment 4.

FIGS. 14 and 15 are diagrams illustrating first and second operation examples of an internal air circulation mode of a ventilation facility of Embodiment 4.

In the internal air circulation mode, opening-closing valves 23 and 24 may be switched to the closed state as illustrated in FIGS. 14 and 15. Further, the blowing direction of fan 16 may be switched so as to be intermittently (for example, at every predetermined interval) and repeatedly inversed.

By such an operation, in the ventilation facility of Embodiment 4, the internal air that is taken from one of two internal air flow paths 15 escapes to the other thereof through bypass flow path 27, and is returned into the vehicle interior.

This internal air circulation mode is an operation mode that is employed when the operation of the heat pump is stopped.

[Effect]

According to the air-conditioning apparatus of Embodiment 4, the same operation and action as those of Embodiment 2 may be obtained by the operation of the external air introduction mode. Further, when the operation of the heat pump is stopped, no useless heat exchange occurs between the internal air streams by the operation of the internal air circulation mode, and hence the internal air may be circulated while the air-tightness inside the vehicle interior is highly maintained and the temperature inside the vehicle interior is maintained. Further, such an internal air circulation mode may be generated by a simple process of closing opening-closing valves 23 and 24. Further, in the internal air circulation mode, since the internal air is circulated without passing through sensible heat exchanger 11 and condenser 13 having a high resistance with respect to the air, the power consumption of fan 16 may be reduced.

Embodiment 5

Figure 16:
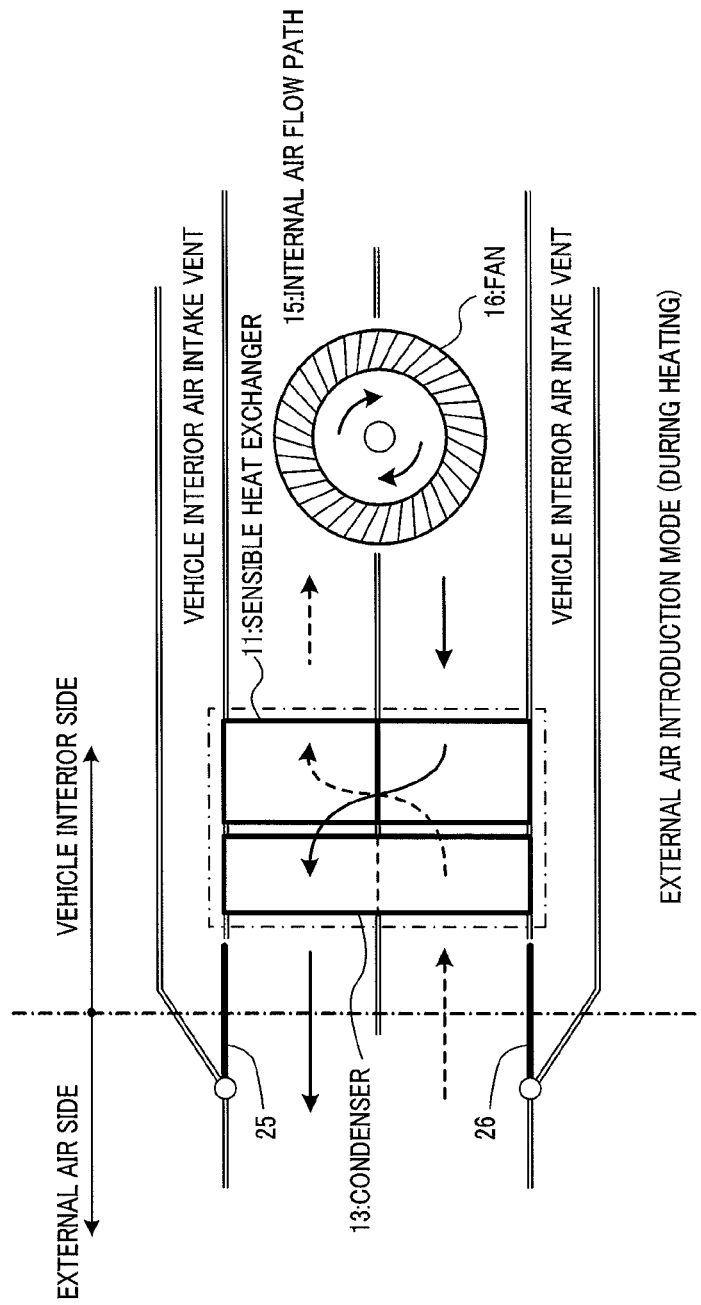
FIG. 16 is a configuration diagram illustrating a ventilation facility of an air-conditioning apparatus of Embodiment 5.

FIG. 16 is a configuration diagram illustrating a ventilation facility of an air-conditioning apparatus of Embodiment 5.

The ventilation facility of Embodiment 5 has a configuration in which opening valves 25 and 26 and the flow path connected to the vehicle interior air intake vent are additionally provided in the ventilation facility of Embodiment 3.

Opening valves 25 and 26 are valves that respectively switch the opened state and the closed state of the vehicle interior air intake vent with respect to the flow paths of two compartments of condenser 13.

[Operation of External Air Introduction Mode]

Figure 17:
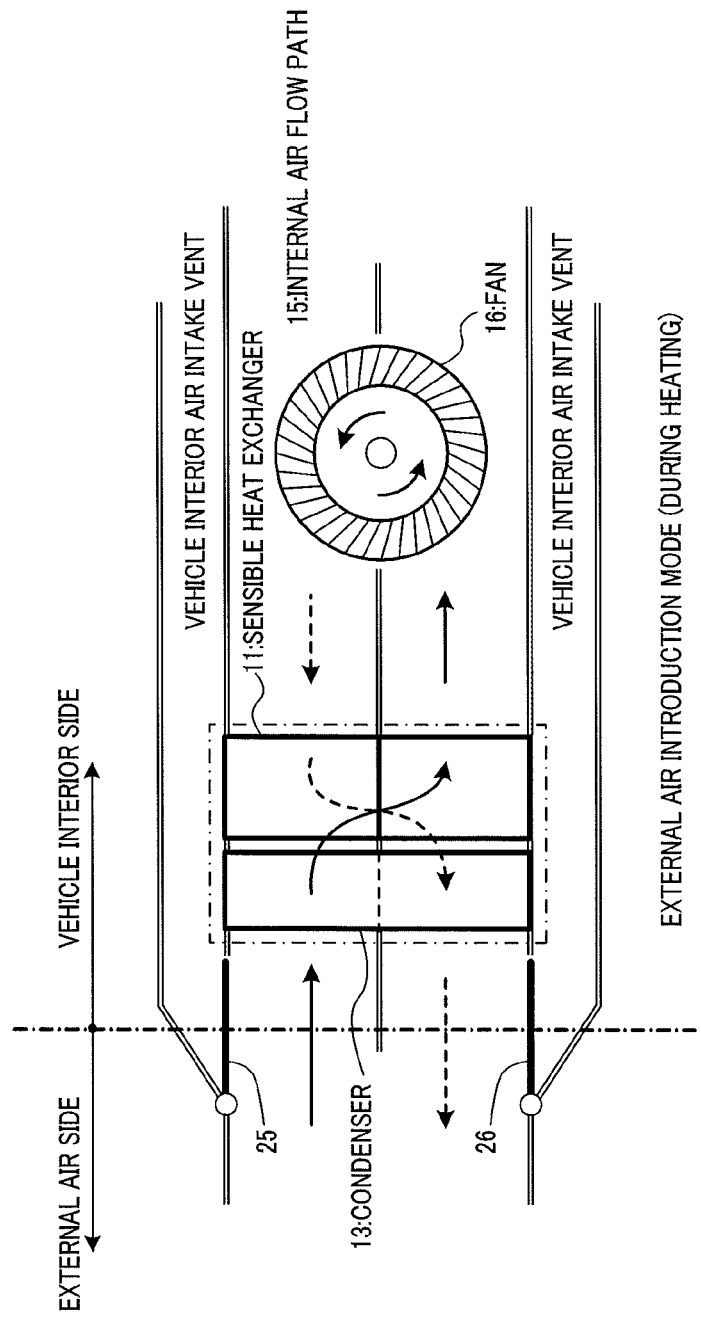
FIG. 17 is a diagram illustrating an operation example of an external air introduction mode of the ventilation facility of Embodiment 5.

FIG. 17 is a diagram illustrating an operation example of an external air introduction mode of a ventilation facility of Embodiment 5.

In the external air introduction mode, opening valves 25 and 26 close the vehicle interior air intake vent as illustrated in FIGS. 16 and 17. The operation and action in this case are the same as those of the ventilation mode of the ventilation facility of Embodiment 2.

[Operation of Internal Air Introduction Mode]

Figure 18:
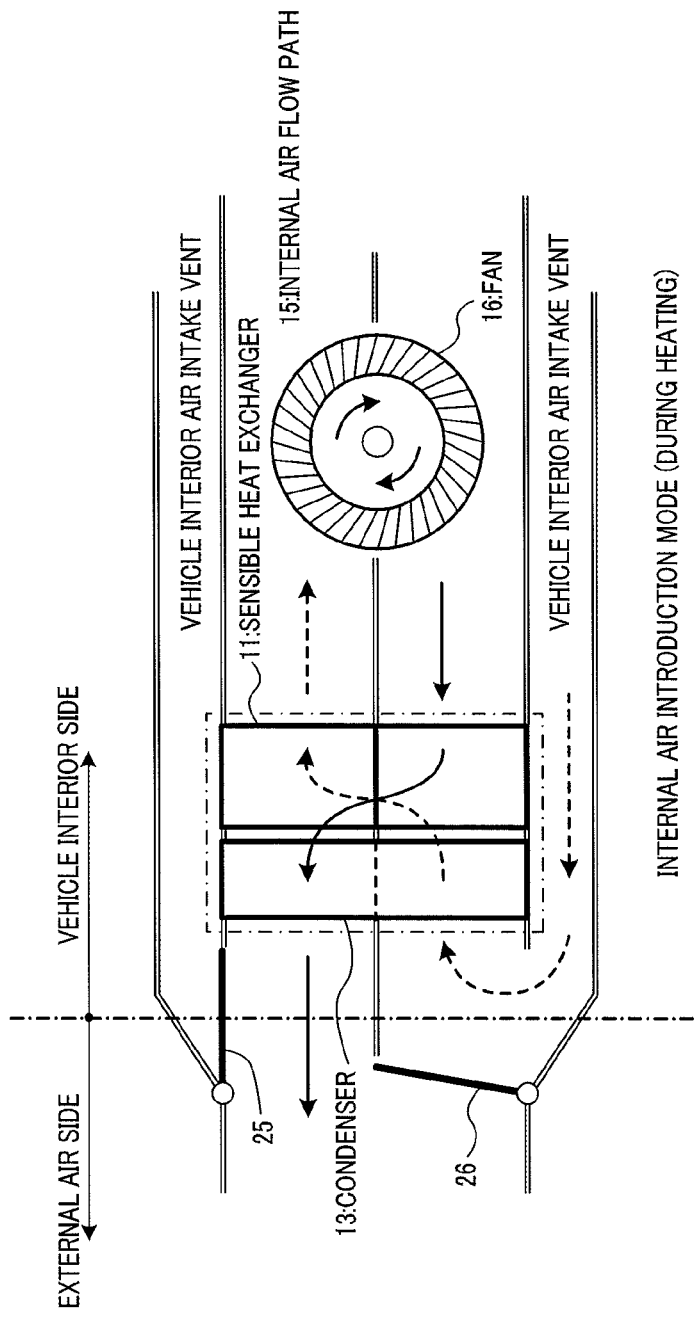
FIG. 18 is a diagram illustrating a first operation example of an internal air introduction mode of the ventilation facility of Embodiment 5.

FIGS. 18 and 19 are diagrams illustrating first and second operation examples of an internal air introduction mode of a ventilation facility of Embodiment 5.

The internal air introduction mode is an operation mode in which the air inside the vehicle interior is included in the air taken to sensible heat exchanger 11 through condenser 13 when opening valves 25 and 26 are opened at an appropriate timing.

In the internal air introduction mode, opening valve 25 closes the vehicle interior air intake vent and opening valve 26 opens the vehicle interior air intake vent in a period for which the blowing direction of fan 16 is the direction in which air is taken from the second flow path of sensible heat exchanger 11 as illustrated in FIG. 18. When opening valve 26 is opened, the entire part of one compartment of the flow path of condenser 13 is connected to the flow path of the vehicle interior air intake vent, and hence the internal air is suctioned into the second flow path of sensible heat exchanger 11.

Further, in the internal air introduction mode, opening valve 26 closes the vehicle interior air intake vent and opening valve 25 opens the vehicle interior air intake vent in a period for which the blowing direction of fan 16 is the direction in which air is taken from the first flow path of sensible heat exchanger 11 as illustrated in FIG. 19. When opening valve 25 is opened, the entire part of the other compartment of the flow path of condenser 13 is connected to the flow path of the vehicle interior air intake vent, and hence the internal air is taken into the first flow path of the sensible heat exchanger.

Then, the state of FIG. 18 and the state of FIG. 19 are intermittently and repeatedly switched.

According to the operation of such an internal air introduction mode, the high-temperature air may be directly sent to condenser 13 without passing through sensible heat exchanger 11 compared to the operation of the internal air circulation mode of the ventilation facility of Embodiment 3. Thus, it is possible to improve an effect of preventing the frost formation of condenser 13 and the defrosting process thereof. Here, in the internal air introduction mode, the heat efficiency is not good in that the air having a temperature substantially equal to the temperature inside the vehicle interior is discharged.

[Effect]

Accordingly, according to the air-conditioning apparatus of Embodiment 5, the same operation and action as those of Embodiment 2 may be obtained by the operation of the external air introduction mode. Further, the operation of the internal air introduction mode makes it possible to promptly improve the heating efficiency by preferentially performing the defrosting process of condenser 13 when the air-conditioning operation is started in an extremely cold region.

Furthermore, in the hybrid vehicle, when the hybrid vehicle runs only by an electric motor for a long period of time, no heat is supplied from the internal-combustion engine to the hybrid vehicle. Electric vehicles have no internal-combustion engine in the first place. For that reason, in the hybrid vehicle or the electric vehicle, frost is generated in condenser 13 when the heat pump is driven. Further, frost is easily generated even in sensible heat exchanger 11 in a cold period. For example, in the heat pump type vehicle air-conditioning apparatus, the temperature of the external air is lower than the temperature (for example, −20° C. or less) of the cooling medium passing through condenser 13, and hence heat is not easily supplied to the cooling medium.

Accordingly, in the hybrid vehicle or the electric vehicle, the effects of the air-conditioning apparatuses of Embodiments 1 to 5 are particularly useful.

Generally, some vehicle air-conditioning apparatuses require the ventilation to be performed by opening a window and others are configured to send a warm wind into the vehicle during a heat operation but to discharge internal air through leakage of the internal air from the window or the like. Thus, in these air-conditioning apparatuses, the heat inside the vehicle interior is uselessly discharged to the outside of the vehicle. On the contrary, according to the air-conditioning apparatuses of Embodiments 1 to 5, the heat inside the vehicle interior is prevented from being uselessly discharged to the outside of the vehicle by sensible heat exchanger 11, and the heat which may not be collected by sensible heat exchanger 11 is sent to condenser 13 and used. Accordingly, the air-conditioning operation inside the vehicle interior may be realized with high efficiency.

The embodiments of the invention have been described above.

Furthermore, in the embodiments, a configuration has been described in which sensible heat exchanger 11 returning only the heat from the exhaust air to the intake air is used as the heat exchanger, but the total heat exchanger that returns the heat and the humidity from the exhaust air to the intake air may be used.

Further, the air-conditioning apparatus of the embodiment of the invention may have a configuration in which the configuration of realizing the internal air introduction mode, that is, the configuration of opening valves 19 and 20 is omitted from the ventilation facility of Embodiment 1.

Further, the air-conditioning apparatus of the embodiment of the invention may employ a configuration including any two sets or the full sets of opening-closing valves 21 and 22 of Embodiment 3, opening-closing valves 23 and 24 of Embodiment 4, and opening valves 25 and 26 of Embodiment 5. In such a configuration, it is possible to selectively perform any two or the entirety of the operation of the internal air circulation mode of Embodiment 3, the operation of the internal air circulation mode of Embodiment 4, and the operation of the internal air introduction mode of Embodiment 5.

Further, as long as the switching valve, the opening-closing valve, and the opening valve of an embodiment can adjust the air flow amount (interrupting and passing the air, and increasing or decreasing the air flow amount), they are not limited to one type. The valves may have, for example, an opening and closing type door shape, a slide door shape, or a circular shutter shape.

Further, in the embodiments, the valves each configured to open and close one flow path has been described as examples of the switching valve, the opening-closing valve, and the opening valve, but valves configured to simultaneously open and close a plurality of flow paths by an integrated valve body may be employed.

In addition, the details of elements illustrated in the embodiments such as the type of fan, the type of flow paths, and the like may be modified within a range not departing from the spirit of the invention.

The disclosure of Japanese Patent Application No. 2011-266205, filed on Dec. 5, 2011, including the specification, drawings and abstract, is incorporated herein by reference in its entirety.

INDUSTRIAL APPLICABILITY

The invention is useful for a vehicle air-conditioning apparatus that is mounted on a hybrid vehicle or electric vehicle.

REFERENCE SIGNS LIST

2 Evaporator
4 Expansion valve
8 Compressor
11 Sensible heat exchanger
12 Heat exchanger unit
13 Condenser
15 Internal air flow path
16 Fan
17 Switching valve (first switching valve)
18 Switching valve (second switching valve)
19 Opening valve (first opening valve)
20 Opening valve (second opening valve)
21, 22, 23, 24 Opening-closing valve
25 Opening valve (third opening valve)
26 Opening valve (fourth opening valve)
27 Bypass flow path

The invention claimed is:

1. A vehicle air-conditioning apparatus comprising:
a first heat exchanger that performs heat exchange between air passing through a first flow path and air passing through a second flow path;
a switching section that alternatively switches one of the first flow path and the second flow path from an exhaust flow path to an intake flow path and the other one of the first flow path and the second flow path from the intake flow path to the exhaust flow path, internal air from a vehicle interior being discharged to the outside of the vehicle interior through the exhaust flow path and external air from the outside of the vehicle interior being introduced into the vehicle interior through the intake flow path; and
a heat pump cycle that includes a second heat exchanger performing heat change between a cooling medium and air-conditioning air, wherein
air passing through the exhaust flow path of the first heat exchanger switched by the switching section is led to the second heat exchanger, and wherein the switching section comprises:
a first switching valve that switches a connection destination of the first flow path between an external air intake vent and an introduction vent toward the second heat exchanger; and
a second switching valve that switches a connection destination of the second flow path between an external air intake vent and the introduction vent toward the second heat exchanger.

2. The vehicle air-conditioning apparatus according to claim 1, further comprising:
a first opening valve configured to open an internal air intake vent communicating with the vehicle interior into an intake vent of the first flow path which is connected to the external air intake vent by the first switching valve; and
a second opening valve configured to open an internal air intake vent communicating with the vehicle interior into an intake vent of the second flow path which is connected to the external air intake vent by the second switching valve.

3. A vehicle air-conditioning apparatus comprising:
a first heat exchanger that performs heat exchange between air passing through a first flow path and air passing through a second flow path;
a switching section that alternatively switches one of the first flow path and the second flow path from an exhaust flow path to an intake flow path and the other one of the first flow path and the second flow path from the intake flow path to the exhaust flow path, internal air from a vehicle interior being discharged to the outside of the vehicle interior through the exhaust flow path and external air from the outside of the vehicle interior being introduced into the vehicle interior through the intake flow path; and
a heat pump cycle that includes a second heat exchanger performing heat change between a cooling medium and air-conditioning air, wherein
air passing through the exhaust flow path of the first heat exchanger switched by the switching section is led to the second heat exchanger, and wherein:
the switching section is a switching fan that switches air flowing directions of the first flow path and the second flow path to a forward direction and a reverse direction; and
the first heat exchanger and the second heat exchanger are adjacent to each other so that the first flow path and the second flow path are respectively connected to two flow paths resulting from division of a flow path of the second heat exchanger.

4. The vehicle air-conditioning apparatus according to claim 3, further comprising an opening-closing valve that opens and closes a flow path communicating with outside of the vehicle from the second heat exchanger.

5. The vehicle air-conditioning apparatus according to claim 3, wherein
the switching fan is disposed in two internal air flow paths that are respectively connected to the first flow path and the second flow path and are communicating with the vehicle interior, and
the vehicle air-conditioning apparatus further comprises:
an opening-closing valve that opens and closes both a path between the switching fan and the first flow path and a path between the switching fan and the second flow path; and
a bypass flow path that connects the two internal air flow paths between the switching fan and the first heat exchanger.

6. The vehicle air-conditioning apparatus according to claim 3, further comprising:
a third opening valve configured to open an internal air intake vent communicating with the vehicle interior into a vehicle exterior flow path of the second heat exchanger connected to the first flow path; and
a fourth opening valve configured to open an internal air intake vent communicating with the vehicle interior into the vehicle exterior flow path of the second heat exchanger connected to the second flow path.

7. The vehicle air-conditioning apparatus according to claim 1, wherein:
the first heat exchanger is a sensible heat exchanger.

* * * * *